US008720670B2

(12) United States Patent
Schulnig

(10) Patent No.: US 8,720,670 B2
(45) Date of Patent: May 13, 2014

(54) GRIPPER DEVICE FOR A STAR CONVEYOR AND STAR CONVEYOR

(75) Inventor: Ludwig Schulnig, Fieberbrunn (AT)

(73) Assignee: Tyrolon-Schulnig Gesellschaft mbH, Hochfilzen (AT)

( * ) Notice: Subject to any disclaimer, the term of this patent is extended or adjusted under 35 U.S.C. 154(b) by 167 days.

(21) Appl. No.: 13/386,444

(22) PCT Filed: Jan. 4, 2011

(86) PCT No.: PCT/EP2011/050064
§ 371 (c)(1),
(2), (4) Date: Jan. 23, 2012

(87) PCT Pub. No.: WO2011/083113
PCT Pub. Date: Jul. 14, 2011

(65) Prior Publication Data
US 2012/0118706 A1  May 17, 2012

(30) Foreign Application Priority Data
Jan. 7, 2010  (EP) .................................. 10150238

(51) Int. Cl.
*B65G 47/86* (2006.01)
(52) U.S. Cl.
CPC ...... *B65G 47/847* (2013.01); *B65G 2201/0244* (2013.01)
USPC ..................................... 198/470.1; 198/803.3
(58) Field of Classification Search
USPC .................. 198/470.1, 803.3–803.1, 377.03, 198/377.07, 459.2
See application file for complete search history.

(56) References Cited

U.S. PATENT DOCUMENTS

| 5,711,411 | A | * | 1/1998 | Zurweller | 198/470.1 |
| 6,302,172 | B1 | * | 10/2001 | De Villele | 141/372 |
| 7,784,603 | B2 | * | 8/2010 | Burgmeier | 198/472.1 |
| 8,002,106 | B2 | * | 8/2011 | Preti et al. | 198/459.2 |
| 2002/0092731 | A1 | * | 7/2002 | Osterfeld et al. | 198/470.1 |

FOREIGN PATENT DOCUMENTS

| CN | 1163226 A | 1/1997 |
| CN | 1140693 A | 10/1997 |
| DE | 29602798 | 10/1996 |
| DE | 20305988 | 8/2003 |
| EP | 0659683 | 6/1995 |
| EP | 1992587 | 11/2008 |
| GB | 2110630 | 6/1983 |
| JP | 57046881 | 3/1982 |
| JP | 10045250 | 2/1998 |
| WO | 03/078285 | 9/2003 |

OTHER PUBLICATIONS

International Search report dated Apr. 5, 2011 for PCT/EP2011/050064.
International Preliminary Report on Patentability and Written Opinion for International Application No. PCT/EP2011/040064 dated Jul. 10, 2012.
Office Action issued Nov. 28, 2013 for Chinese Patent Application No. 201180002359.7.

* cited by examiner

*Primary Examiner* — Mark A Deuble
(74) *Attorney, Agent, or Firm* — Morgan Lewis & Bockius LLP

(57) ABSTRACT

The present invention relates to a star conveyor (1) and to a gripper device (2) for such a star conveyor or similar conveying unit, comprising gripper arms (4) arranged in a corresponding manner in pairs for gripping and holding a vessel (3) or similar body in a gripped position, wherein the gripper device (2) comprises at least one positioning element (6) that is independent of the gripper arms (4). Said positioning element is designed such that it positions the vessel (3) to be gripped at least along one axis in the gripped position.

9 Claims, 4 Drawing Sheets

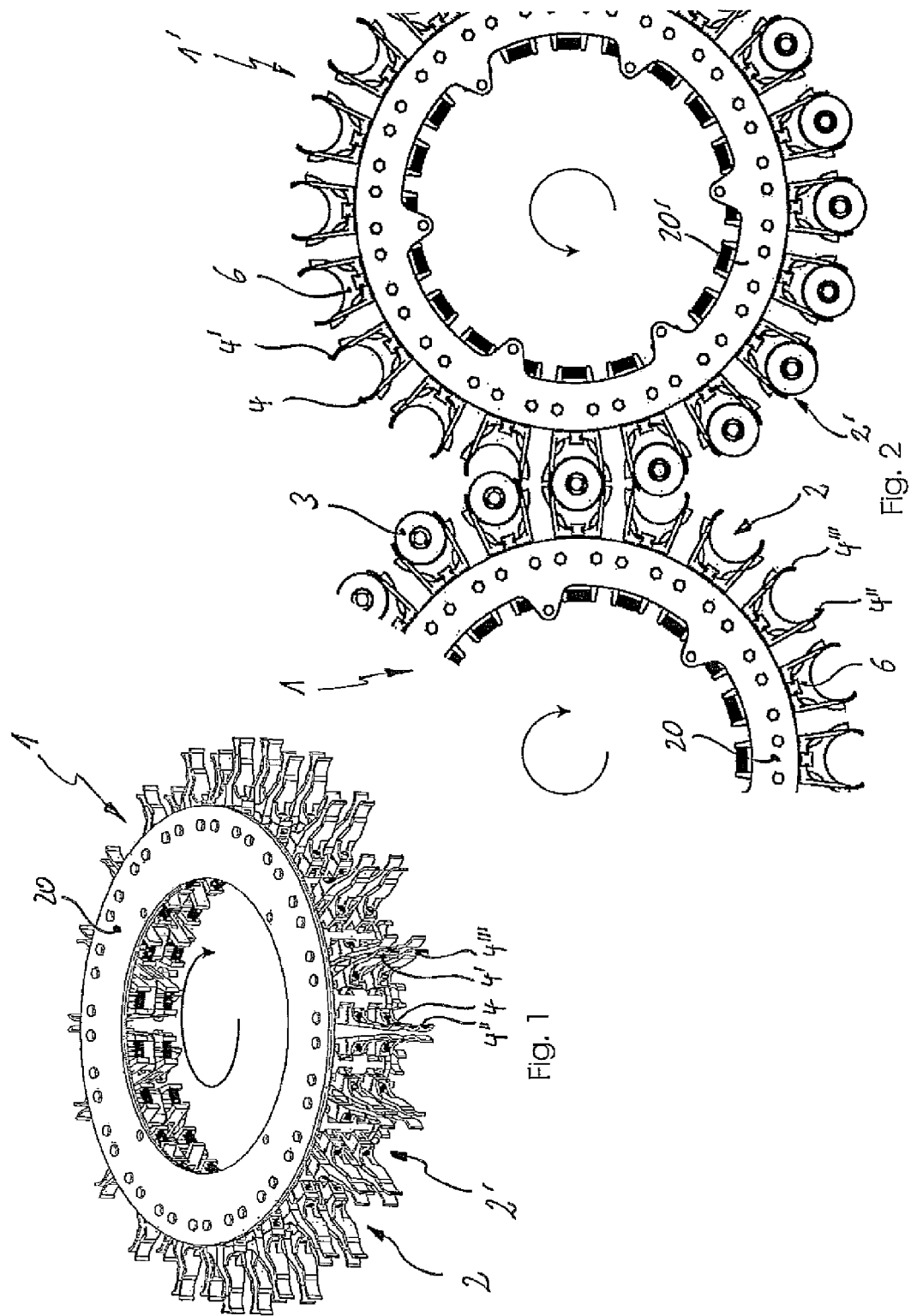

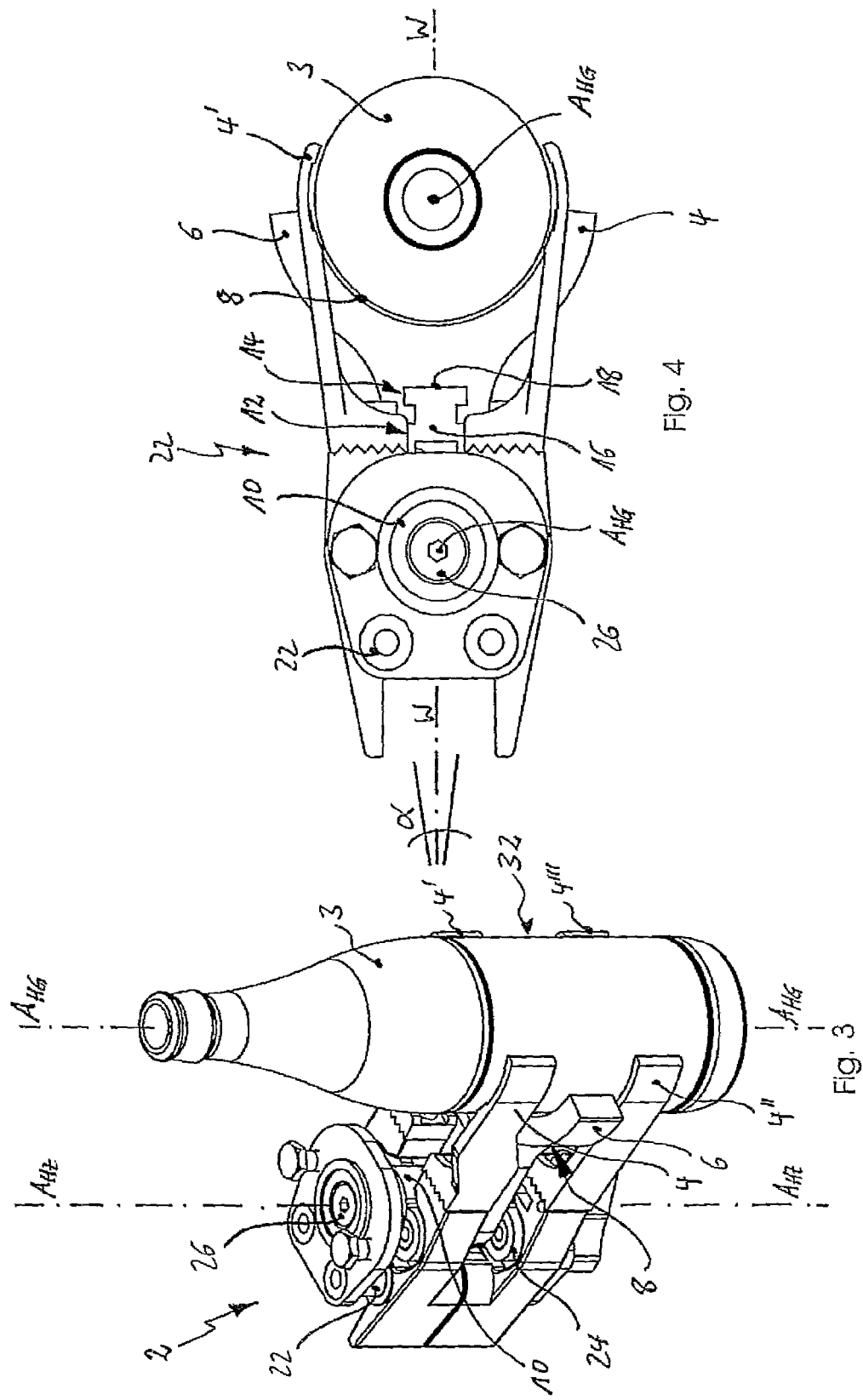

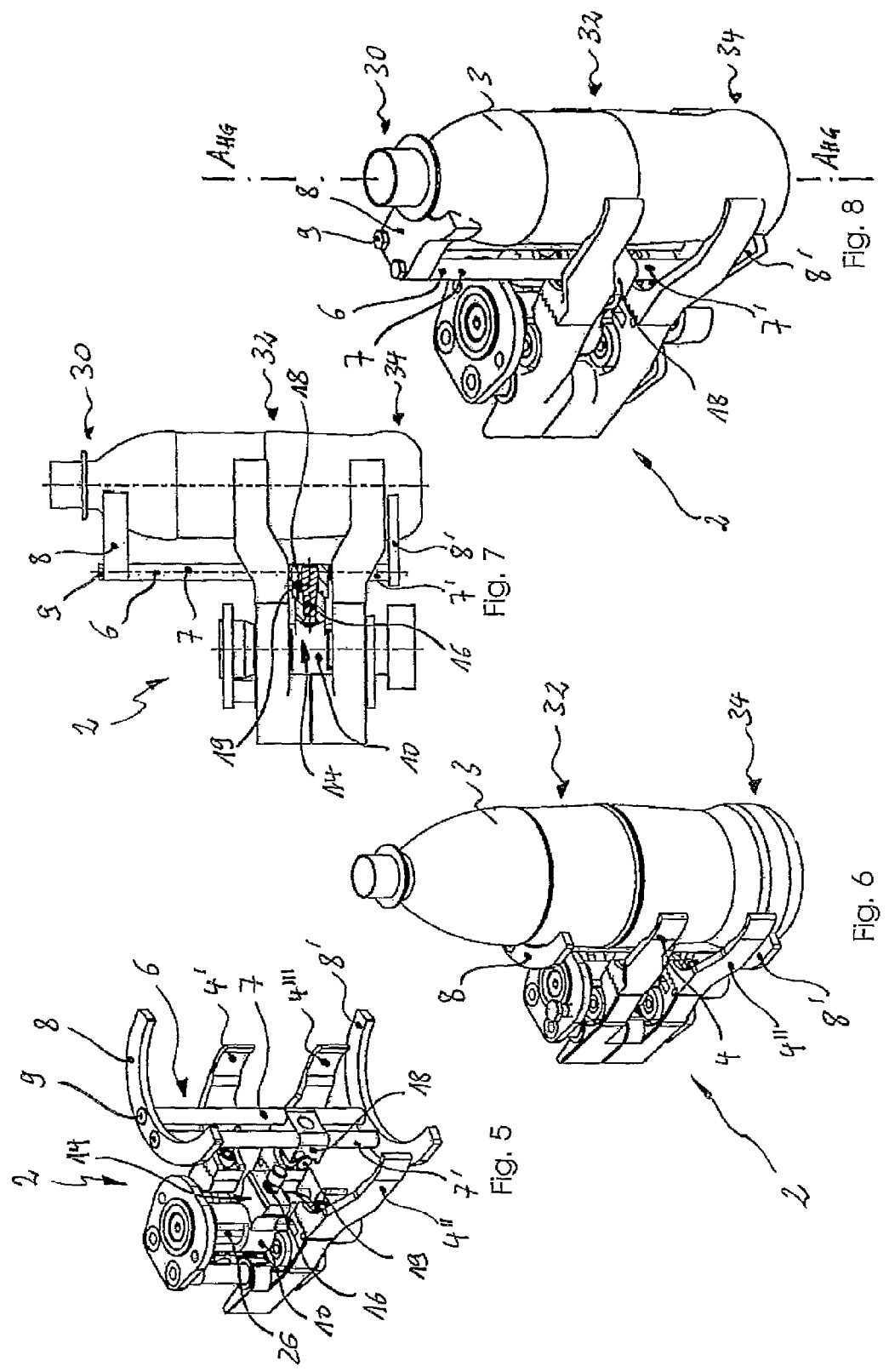

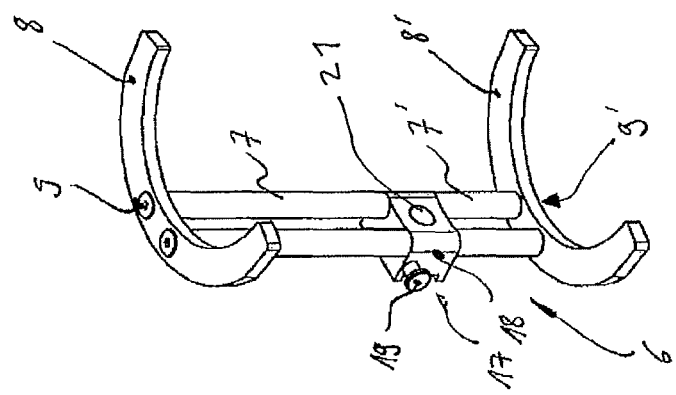
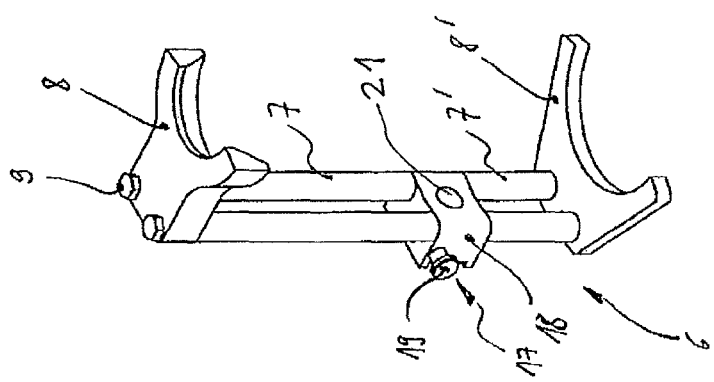
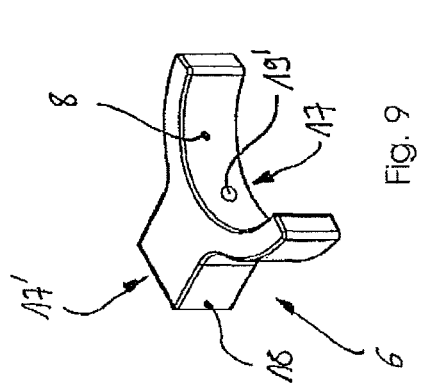
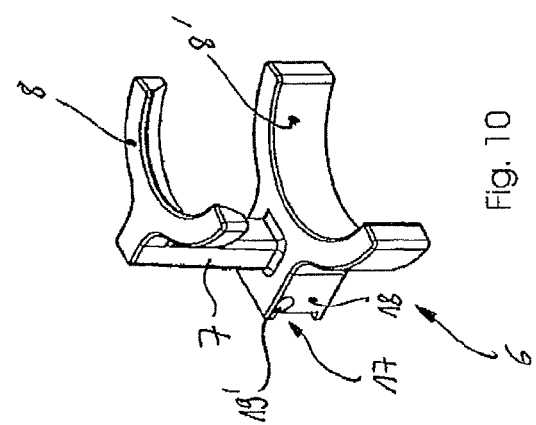

GRIPPER DEVICE FOR A STAR CONVEYOR AND STAR CONVEYOR

This application is a National Stage Patent Application of International Application No. PCT/EP2011/050064, filed Jan. 4, 2011, which claims priority to European Patent Application No. 10150238.3 filed on Jan. 7, 2010 which are each incorporated herein by reference in their entirety.

The present invention relates to a gripper device for a star conveyor or similar conveying unit comprising gripper arms arranged in corresponding pairs for gripping and holding a container or similar body in a gripped position.

In addition, the present invention also relates to a star conveyor for containers or similar bodies comprising a rotatable base body and a plurality of gripper devices of the afore-mentioned type distributed around its periphery.

Such star conveyors and gripper devices for star conveyors are known as such, for example in filling machines for the beverage industry. They serve in automated operations to transport, feed and convey away containers, particularly, but not exclusively limited to, bottles such as for beer, water or soft drinks. Thus, a star conveyor and the plurality of gripper devices arranged thereon are fed containers, for example along a conveyor belt, said containers being gripped by the paired gripper arms of the gripper device and taken out of the conveyor feed by the rotating star conveyor. The star conveyor then rotates until the containers in its grip are in the correct position, for example over an outgoing conveyor belt, at which point the gripper devices release the containers in their grip. The gripping and opening actions are usually automatically regulated by a corresponding control unit.

A plurality of various different star conveyors and gripper devices for such star conveyors as well as for other related mechanisms, all subsumed here under the term star conveyor, are known from the prior art.

The speed at which the above star conveyors rotate and/or the gripper devices switch between an open position and a gripped position make a precise alignment of the gripping motion and an exact positioning of the gripped container in the gripped position imperative. Various different designs addressing the problem of the exact positioning of the gripped containers or the aligning of the gripper arms are known in the prior art.

For example, DE 203 05 988 U1 describes a gripper device disposed on the underside of a star conveyor support ring. The gripper arms of each gripper device are arranged in pairs facing radially outwardly relative the support ring and can be moved from the closed into the open position and vice versa by a control unit. The gripper arms themselves consist of radially outward-facing gripper arms and radially inward-facing counterarms. A centering gear tooth system is disposed on the counterarms such that the gripper arms are coupled to one another when moving between the open and closed position. This design allows a relatively exact gripping of the containers even at high operating cycles although it is very costly in terms of its construction and especially material costs.

DE 296 02 798 U1 shows another implementation. Here, although the gripper devices likewise consist of radially outward-facing gripper arms, only one gripper arm is configured with a radially inward-facing counterarm. This counterarm abuts a camshaft arranged perpendicular to the rotational axis of the base body which forms the control element. The rotating of the camshaft brings the gripper device into a closed or open position. The gripper arms are thereby pressed apart from the closed into the open position by a pressure spring arranged between the two radially outward-facing gripper arms. To ensure uniform gripping motion, the two gripper arms are coupled together by a centering gear tooth system. Here, too, the material costs to manufacture the gripper device are relatively high, plus it is relatively complex to make adaptations to different types of containers to be gripped.

Basically, the problem addressed is that of ensuring exact positioning for a gripped container in the gripping range of the gripper device, on the star conveyor respectively, and moreover being able to manufacture the gripper device at an acceptable material expense.

It is thus the task of the present invention to provide a gripper device for a star conveyor as well as a star conveyor itself which grants a secure and exact gripping of the containers or similar objects to be gripped at an economical manufacturing cost.

This task is solved by a gripper device in accordance with claim 1 and by a star conveyor in accordance with claim 12.

This task is in particular solved by a gripper device for a star conveyor or similar conveying unit comprising gripper arms arranged in corresponding pairs for gripping and holding a container or similar body in a gripped position, wherein the gripper device comprises at least one positioning element independent of the gripper arms which is configured such that it positions the container to be gripped in the gripped position at least along one axis.

In addition, the task is also solved by a star conveyor for containers or similar bodies comprising a rotatable base body and a plurality of gripper devices of the afore-mentioned type distributed around its periphery.

In the context of the present invention, a container is to be understood as any object, and in particular any volumetric solid, which can be gripped, transported or positioned in an automated process.

A substantial difference from the gripper devices known in the prior art is the use of a positioning element independent of the gripper arms which at least positions the container to be gripped in the gripped position. The positioning element thereby on the one hand increases the accuracy of the gripper device, and in particular the resulting positioning of the container even when a gripper device exhibits wear and, on the other hand, lessens the load on the other components of the gripper device, in particular the gripper arms. This yields smaller component cross sections and thus less expense and, because of the reduced weight, components which also last longer. Positioning the container to be gripped reduces the "positioning load" introduced, particularly asymmetrically, into the gripper device. It is precisely this type of load which leads to high loading stress and high equipment wear in the prior art gripper devices.

Substantially fundamental is that the positioning element is configured independently of the gripper arms. Among other things, this "independence" thus refers to its arrangement within the gripper device and in particular to the fact that when the gripper arms move, or at least one gripper arm moves, the positioning element does not move, or in any event moves independently of the arm(s).

The positioning element preferably comprises at least one positioning stop against which the container to be gripped strikes at least in the gripped position. Depending on the container to be gripped, one or more positioning stops can be used here. The positioning stops are thereby designed such that they center the container to be gripped in the intended gripped position or, should the container not be in the gripped position, facilitate its positioning. This positioning can ensue in interaction with the gripper arms, as will be described in greater detail below.

At least one positioning stop is preferably configured at least partly complementary to the outer contour of the container to be gripped. This means that in the case of a cylindrical bottle, for example, at least one positioning stop at least partly mimics the bottle's external geometry.

It is then possible to configure e.g. a curvilinear positioning stop which precisely butts against the outer contour of the bottle to be gripped when in the gripped position. Adapting to the outer contour of the container can ensue mono-axially, bi-axially or even tri-axially.

The positioning stop(s) is/are preferably arranged relative the gripped position of the container such that they effectively position and in particular support the container in the gripped position. Hence, it is advantageous to make use of at least two positioning stops which support the container to be gripped along its principal extension axis, preferably at its end regions. In the case of a bottle being the container to be gripped, preferred anchorage points for respectively one or more positioning stops would thus be the base of the bottle and the neck of the bottle. The taller the containers to be gripped (compared to their width), the more importance these points have. Thus, the positioning stops are preferably disposed as far away as possible from the center of mass of the container to be gripped.

The gripper arms and the positioning element are preferably configured and arranged relative one another such that the container to be gripped is pressed against the positioning element during the gripping process. While the gripper arm grips the container, the container to be gripped is thus "entrained" by the gripper arms and pushed toward the positioning element, its positioning stop respectively. On the one hand, this ensures the proper positioning of the container in the gripped position and, on the other, reduces the loads acting on the other components of the gripper device as the gripper arms pressing the container against the positioning element, its positioning stop respectively, produces increased frictional forces and thus securely holds the container in the gripped position.

In conjunction hereto, it is possible for the gripper arms to be configured so as to for example correspond at least in partly complementary fashion to the external geometry of the container to be gripped so that when gripped, the container slides into an optimum gripped position and thus is at the same time pushed against an accordingly positioned and configured positioning stop of the positioning element.

The positioning element, at least one positioning stop respectively, preferably has a suitable adhesive coating to ensure the reliable positioning of the container in the gripped position. Such an adhesive coating can be a rubber coating, for example, same effecting high static friction force between the positioning element/stop and the container.

Precisely with rotating star conveyors, the inventive design of the gripper arms, the positioning elements respectively, with which the container which to be gripped is pressed against the positioning element during the gripping process, allows a very dense fitting of the gripper devices around the star conveyor periphery.

With a gripper device having paired gripper arms arranged on both sides of a central body and by means of which the gripper device is preferably attached to the star conveyor, the positioning element is preferably arranged at a mounting point on the central body which, in a viewing direction along the central body principal axis, lies between the paired gripper arms. In this viewing direction, the gripper arms thus in essence engage around the mounting point of the positioning element so that the positioning element can fit compactly into the equipment.

The positioning element is preferably configured axially symmetrical to the bisector of the angle enclosed by the gripper arms in their gripped position. Precisely in the case of gripper arms coupled together by means of a coupling gearbox, this type of symmetrical configuration to the positioning element ensures a compact gripping aid having very accurate gripping efficiency. The positioning element arranged "between" the gripper arms being preferably pushed against the container to be gripped by the gripper arms results in a gripper device which enables reliable positioning at low material and space needs, even at high gripping cycles.

The positioning stop is preferably adjustable relative the gripper device along at least one axis by means of an adjusting device. This positioning stop adjustability allows for adapting to different containers and also adapting to possibly inaccurately functioning gripper devices. In the above-mentioned arrangement of the positioning stop in the region of a bottle's base and neck and as a basic principle when employing the inventive positioning element in the case of very tall objects, it is advantageous for the adjusting device to allow just such a positional shifting of the positioning stop in the end region of the container to be gripped.

It can in principle be advantageous for the positioning element to have positioning stops arranged in these end regions of the container to be gripped.

The positioning element is preferably disposed rigidly on the gripper device and in particular on a central body. This increases the accuracy at which the containers to be gripped in the gripped position are positioned. But it is moreover also possible for the positioning element to be disposed on the gripper device by means of a suitable actuator so that during its gripping motion, the gripper arm moves for example toward the gripping area and toward the container to be gripped or into a similar stipulated position at which it can then position the container to be gripped. Such an actuator can for example be a control unit, in particular coupled to the control unit for the gripper arms, so that the motion of the positioning element occurs at the same time or is coupled to the motion of the gripper arms. All the designs known from the prior art are applicable here. In particular, the positioning element can be operatively connected to a camshaft, the cam of which controls the gripper arms and comprises a positioning cam which then moves the positioning element into its required position.

The positioning element is preferably detachably disposed on the gripper device via a mounting mechanism. This allows for adapting to different containers and equipping existing gripper devices with positioning elements when needed. It is thus for example possible to only first equip a star conveyor having gripper devices with positioning elements when their gripping accuracy diminishes due to worn components.

The mounting mechanism preferably comprises a mounting projection on the gripper device, and in particular on the central body, and a mounting support on the positioning element, or vice versa, able to be brought into releasable operational engagement with one another. It is thus for example possible to dispose a mounting mandrel on the gripper device, and in particular on the above-cited central body, to which the positioning element with a correspondingly complementary configured mounting mandrel support attaches and can be locked in position there. Another possibility is providing for a tongue and groove system in which for example a suitable T-shaped tongue projects from the gripper device over which the positioning element having a correspondingly complementary configured support can then slide preferably parallel to the axis of extension of the central body.

The mounting mechanism is preferably designed so as to allow the positioning element to be mounted/dismantled without the need for tools. It is for example possible to provide for an appropriate spring-loaded pressure bolt on the mounting mechanism which in the locked state engages behind a mounting projection on the gripper device and thus locks the positioning element to the gripper device. Pulling on said spring-loaded pressure bolt releases the locking and allows removal of the positioning element.

The interchangeability of the positioning elements in principle allows the gripper device to be adapted to different containers, whereby the speed and ease of making such changes reduces system downtime and thus saves costs.

The positioning element is preferably made of injection molded plastic. The resulting injection molded component allows for a cost-effective equipping of the gripper device with the inventive positioning element.

As already discussed above, the positioning stop is preferably adjustable relative the gripper device along at least one axis by means of an adjusting device. Various different adjusting elements, i.e. replacement parts, components of variable length and shape, adapters, etc. can be used for this purpose. The positioning element is preferably of multi-part configuration, comprising at least a main body and at least one positioning stop which can be connected to one another by means of a suitable mounting mechanism. This allows different main bodies and different positioning stops to be grouped together to yield different positioning elements. It is conceivable to configure the positioning element with at least one main body which can in particular be detachably disposed on the gripper device by means of a mounting support and can be equipped with the corresponding detachable positioning stops which then positionally line up with the container to be gripped in the gripped position. These detachable positioning stops then allow the respective adapting of the positioning element to different containers to be gripped. Additionally, diversely formed main bodies can also be used for adaptation purposes. A main body can in particular also be provided with appropriate additional or replacement elements by means of which the position of the positioning stops can be changed. Of course it is also possible for the positioning element to have a telescopic or similar design so as to be size or height-adjustable in order to enable the positioning element to be adapted to different containers or even gripping positions.

The following will reference the accompanying drawings as relates to embodiments describing the invention in greater detail. Shown are:

FIG. 1 an isometric depiction of a star conveyor according to the prior art;

FIG. 2 a schematic plan view of a transfer point between two star conveyors according to one embodiment of the invention;

FIG. 3 an isometric depiction of an embodiment of the inventive gripper device;

FIG. 4 a plan view of the gripper device according to FIG. 3;

FIG. 5 an isometric depiction of a further embodiment of the gripper device;

FIG. 6 an isometric depiction of the gripper device according to FIG. 5 in a gripped position;

FIG. 7 a cross section through a further embodiment of the inventive gripper device in the gripped position;

FIG. 8 an isometric depiction of the FIG. 7 embodiment in the gripped position;

FIGS. 9-12 isometric depictions of different embodiments of the positioning element according to the invention.

The same reference numerals are used in the following for equivalent components or components having the same effect, wherein high indices are sometimes used.

FIG. 1 shows an isometric depiction of a star conveyor 1 as already known from the prior art. The star conveyor 1 comprises a base body 20 on which a plurality of gripper devices 2 are radially arranged. The respective gripper devices 2 here each comprise a corresponding pair of gripper arms 4 designed to grip a container 3 (see FIG. 2). The star conveyor 1 serves as a conveying device for containers, for example in beverage industry filling stations, but also in other stations set up to grip, transport and in particularly transfer objects such as beverage bottles, broadly referred to here as "containers."

FIG. 2 depicts such a point of transfer in an embodiment of the star conveyor 1 according to the present invention. Here as well the two star conveyors 1 comprise a base body 20, on the underside of which the inventive gripper devices 2 are arranged. The gripper devices 2 again exhibit a pair of gripper arms 4 (also see FIG. 3) designed to grip containers 3. At the point of transfer depicted here, containers 3 are transferred from star conveyor 1 to a second star conveyor 1'. To this end, the two star conveyors 1 rotate relative one another such that the containers 3 gripped by star conveyor 1, its gripper devices 2 respectively, can be fed to the other star conveyor 1', its gripper devices 2 respectively.

According to the invention, all the gripper devices are thereby equipped with positioning elements 6 which allow or secure the positioning of the containers 3 in the gripped position.

FIGS. 3 and 4 show an embodiment of the gripper device 2 as it is employed in the star conveyors 1 according to FIG. 2 for example; FIG. 3 being an isometric depiction and FIG. 4 being a plan view.

The gripper device 2 exhibits the above-mentioned corresponding gripper arms 4, depicted here in a gripped position securing a container 3, here a beverage bottle.

According to the invention, the gripper device 2 comprises a positioning element 6, here configured as an injection molded plastic component, to position a container 3 in the gripped position or to maintain a precise gripped position respectively.

The positioning element 6 comprises a positioning stop 8, which in the present embodiment positions in the central area 32 of the container 3 and thus enables the container 3 to be precisely positioned.

The gripper arms 4 and the positioning element 6, its positioning stop 8 respectively, are thereby designed in accordance with the invention such that the gripper arms 4 press the container 3 against the positioning element 6, its stop 8 respectively, during the gripping process. Among other things, this produces static friction force at the positioning stop which leads to improved fixation of the container 3 in the gripped position.

The positioning element 6 is arranged in this embodiment on a central body 10 of the gripper device 2 on which the corresponding gripper arms 4 are additionally arranged on both sides. Said gripper arms 4 are respectively attached to the central body 10 over a rotational axis 22 and can move between an open position (not shown) and the gripped position by means of a camshaft 26 supported in the central body 10 and in operative connection with corresponding bearing elements 24 of the gripper arms 4.

In line with the invention, the positioning element 6 is thereby disposed on a mounting point 12 on the base body 10 situated on a bisector W of angle α enclosed by the respective pair of gripper arms 4, 4'/ 4", 4'".

The positioning element 6 is detachably disposed on the gripper device 2, here on base body 10, via mounting mechanism 14. The mounting mechanism 14 exhibits hereto a mounting projection 16 arranged on base body 10 and a mounting support 18 configured on positioning element 6. In this embodiment, the mounting projection 16 is a grooved mounting projection which projects from the central body 10 substantially perpendicular to the principal axis of extension $A_{HZ}$ of the central body, or perpendicular to the principal axis of extension $A_{HG}$ of the container respectively, onto which the positioning element 6 with the mounting support 18 can be slid from above toward the principal axes of extension $A_{HZ}$, $A_{HG}$. The principal axis of extension $A_{HZ}$ runs parallel to the principal axis of extension $A_{HG}$ of the container 3 here so as to ensure a secure fixing of the positioning element 6. Utilizing mounting mechanism 14 enables positioning element 6 to be mounted to the central body 10 without tools.

As particularly depicted in FIG. 4, the positioning element 6, and in particular its positioning stop 8, are configured complementary to a portion of the external geometry of container 3. This ensures a secure and precise positioning of the container 3 in the gripped position, as depicted particularly in FIGS. 3 and 4. As previously mentioned, the gripper arms 4 are thereby designed such that they press the container 3 against the positioning stop 8 during the gripping process and, due to their complementary design to the external form of the container 3, also into the correct gripped position.

FIGS. 5 and 6 show a further embodiment of the inventive gripper device 2 in an isometric representation in an opened position without a container (FIG. 5) and in a gripped position holding a gripped container 3 (FIG. 6). In contrast to the previously described embodiment, the positioning element 6 depicted here exhibits two positioning stops 8 to position the container 3 at different positions, namely at a lower end region 34, corresponding roughly to the base of the container, and at a central region 32. Here as well, the gripper arms 4 are configured such that they press the container 3 against the respective positioning stop 8 of positioning element 6 in the gripped position (FIG. 6). For the sake of clarity, only three of the four gripper arms 4 needed to position and to grip in this embodiment are depicted in FIG. 5 so as to provide a clear view of the central body 10 and the camshaft 26 mounted therein, same to be described in greater detail below.

According to this inventive embodiment, the positioning element 6 exhibits a somewhat different mounting mechanism 14 for the detachable mounting of the positioning element 6 to the gripper device 2, respectively to the central body 10. Although a mounting projection 16 arranged on and projecting perpendicular from the central body 10 is also provided here, the mounting support on the positioning element 6 is of somewhat different design than was the case above with FIGS. 3 and 4. According to the invention, the mounting support 18 here is provided with a spring-loaded pressure bolt 19 which allows the locking and unlocking of the positioning element 6 to the central body 10. To this end, the spring-loaded pressure bolt 19 can move so as to release or create a locking engagement with the grooved mounting projection 16. In this respect, the positioning element 6 can thus also be mounted to and dismantled from the central body 10 without the need for tools.

In the present embodiment, the positioning element 6 exhibits a main body 7 to which the above-noted positioning stops 8 are detachably affixed by means of suitable mounting means 9. The mounting means 9 are depicted here as bolts which can screw into the main body 7. Of course other mounting means such as locking catches, spring-loaded fixing bolts or similar quick release fasteners can also be employed here to configure the mounting stops 8 so as to in particular be able to be mounted to or dismantled from the main bodies 7 without tools. This type of design allows positioning stops 8 to be used which can variably adapt to the container 3 to be gripped. Thus, in this embodiment, not only is the positioning element 6 configured to be detachable from the central body 10, but also each of the positioning stops 8/8' are also of detachable and thus adaptable configuration. As still to be described in greater detail below (see FIGS. 9 to 12), it is furthermore possible to likewise configure the main body 7 so as to be exchangeable and thus have an even more adaptable configuration to the positioning element.

It is clear from the embodiment depicted in FIG. 5 that it is of course also possible to couple the positioning element 6 to the camshaft 26 by means of an actuator (not shown) such that it actively effects a positioning of container 3, particularly in the gripped position, but also prior to or after reaching the gripped position. Hence, the mounting projection 16 can be for example coupled to the camshaft 26 such that shortly before reaching the gripped position, it urges the positioning element 6 toward the gripped position and thus effects active positioning or even an additional anchoring of the container 3.

FIGS. 7 and 8 depict a further embodiment of the gripper device 2 in a longitudinal section view (FIG. 7) and an isometric representation (FIG. 8). The gripper device 2 depicted therein only differs from the gripper device 2 depicted in FIGS. 5 and 6 by the design to its positioning element 6 and in particular the design to the positioning stops 8 and the base body 7.

In the embodiment depicted here, the base body 7 and the positioning stops 8 are configured such that they do not grip the gripped container 3 at its central region 32 but rather, in addition to the lower end region 34, also at the upper end region 30; i.e. the neck of the container. Particularly in the case of very tall containers 3 (compared to their width), this type of configuration to the positioning element 6 effects a very exact and secure positioning of the container 3, even in the case of rapid gripping cycles.

As depicted particularly in FIG. 8, the upper positioning stop 8 is thereby configured at the upper end region 30 such that it is adapted not only to the cross-sectional radius but also the cross-sectional profile over the height of the container 3 along its principal axis of extension $A_{HG}$. This ensures further exact positioning and produces static friction which relieves load on the other components of the gripper device 2. Here as well, the positioning stops 8 are again disposed on the main bodies 7 in detachable fashion via mounting means 9. The positioning stop 8 is adjustable relative the gripper device 2 along at least one axis by means of an adjusting device 21. To allow an adapting of the positioning stops 8 along the container's principal axis $A_{HG}$ according to the invention, at least one main body 7 can be removed from the mounting support 18 and replaced by an adapted, in this case more elongated, main body 7. What this thus means is that the embodiment of the positioning element 6 depicted in FIGS. 7 and 8 corresponds to the embodiment depicted in FIGS. 5 and 6 albeit with adapted main bodies 7 and positioning stops 8.

FIG. 7 depicts the embodiment of the mounting means 14 in a sectional view. Discernible here is the mounting projection 16 configured on the central body 10 which engages in the mounting support 18 and is locked by the spring-loaded pressure bolt 19.

FIGS. 9 to 12 show different embodiments of the positioning element 6 in isometric representation. FIGS. 9 and 10 thereby each show a positioning element 6 having integrally configured positioning stops 8. FIGS. 11 and 12, on the other hand, show the positioning stops 8 detachably disposed on the two main bodies 7 and affixed via mounting means 9. As described above with reference to FIGS. 7 and 8, the main bodies 7 are likewise detachably arranged on the mounting support 18 such that they are interchangeable with different main bodies, in particular main bodies of various different lengths.

FIGS. 9 to 12 further depict different mounting mechanisms 18, respectively locking means 17, to affix the positioning elements 6 to the respective central body 10 or to another component of the gripper device 2.

The positioning element 6 shown in FIG. 9 corresponds in this regard to the positioning element depicted in FIG. 4 which can be slid from above (relative the principal axis $A_{HZ}$ of the central body, respectively the principal axis $A_{HG}$ of the gripped container 30 (FIG. 4)) onto a correspondingly configured mounting projection 16 employing a corresponding mounting support 18. A set screw (not shown), insertable into a corresponding drill hole 19' in mounting support 18 to then line up in locking fashion with the corresponding mounting projection 16 (FIG. 4), is provided to safeguard against inadvertently slippage of the mounting projection 16.

FIG. 10 shows a similar screw design in which the positioning element 6 with its mounting support 18 is likewise attached to a mounting projection 16 (also see FIG. 7); retention is however then provided by a laterally embedded drill hole 19' (compared to FIG. 9) and a locking screw (not shown) introduced therein.

FIGS. 11 and 12 show a locking means 17 as was already described in detail with reference to FIGS. 5 to 8 in which retention is provided by means of a spring-loaded pressure bolt or similar self-locking elements.

LIST OF REFERENCE NUMERALS

1 star conveyor
2 gripper device
3 container
4 gripper arm
6 positioning element
7 main body
8 positioning stop
9 mounting means
10 central body
12 mounting point
14 mounting mechanism
16 mounting projection
17 locking means
18 mounting support
19 spring-loaded pressure bolt or self-locking element
19' drill hole
21 adjusting device
22 rotational axis of gripper arm
24 bearing element
26 camshaft
30 upper end region or container neck
32 central region
34 lower end region or container base
$A_{HZ}$ central body principal axis
$A_{HG}$ container principal axis
W angle bisector
α angle between the gripper arms

The invention claimed is:

1. A gripper device for a star conveyor or similar conveying unit comprising:
   gripper arms arranged in corresponding pairs for gripping and holding a container or similar body in a gripped position,
   wherein the corresponding paired gripper arms are arranged on both sides of a central body,
   wherein the gripper device comprises at least one positioning element independent of the gripper arms which is configured such that the at least one positioning element positions the container to be gripped in the gripped position at least along one axis,
   wherein the positioning element is detachably disposed or disposable on the gripper device by a mounting mechanism,
   wherein the mounting mechanism comprises a mounting projection on the gripper device and a mounting support on the at least one positioning element, or a mounting projection on the at least one positioning element and a mounting support on the gripper device, configured to be brought into releasable operational engagement with one another,
   wherein the mounting mechanism is formed as a tongue and groove system.

2. The gripper device according to claim 1, wherein the at least one positioning element comprises at least one positioning stop configured such that the container to be gripped strikes against it at least in the gripped position.

3. The gripper device according to claim 2, wherein the at least one positioning stop is at least partly configured complementary to the outer contour of the container to be gripped.

4. The gripper device according to claim 1, wherein the gripper arms and the at least one positioning element are configured and arranged relative one another such that the container to be gripped is pressed against at least one the positioning element during the gripping process.

5. The gripper device according to claim 1, wherein the corresponding paired gripper arms are arranged on both sides of a central body, the at least one positioning element is arranged at a mounting point on the central body which, in a viewing direction along the central body principal axis $A_{HZ}$, lies between the correspondingly paired gripper arms.

6. The gripper device according to claim 1, wherein the at least one positioning element is configured axially symmetrical to the bisector W of an angle α enclosed by the gripper arms in their gripped position.

7. The gripper device according to claim 2, wherein the at least one positioning stop is adjustable relative the gripper device along at least one axis by means of an adjusting device.

8. The gripper device according to claim 1, wherein the at least one positioning element is of multi-part configuration, wherein the at least one positioning element comprises at least one main body and at least one positioning stop which are connectable to one another via suitable mounting means.

9. A star conveyor for containers or similar bodies comprising a rotatable base body and a plurality of gripper devices according to claim 1 distributed around its periphery.

* * * * *